United States Patent [19]
Mayfield

[11] Patent Number: 5,809,529
[45] Date of Patent: Sep. 15, 1998

[54] PREFETCHING OF COMMITTED INSTRUCTIONS FROM A MEMORY TO AN INSTRUCTION CACHE

[75] Inventor: Michael John Mayfield, Austin, Tex.

[73] Assignee: International Business Machines Corporation, Armonk, N.Y.

[21] Appl. No.: 554,202

[22] Filed: Nov. 6, 1995

Related U.S. Application Data

[63] Continuation-in-part of Ser. No. 518,348, Aug. 23, 1995, and Ser. No. 531,948, Sep. 18, 1995.

[51] Int. Cl.$^6$ .................................................. G06F 9/38
[52] U.S. Cl. ..................... 711/137; 711/213; 711/123; 711/122; 395/383; 395/584
[58] Field of Search ........................... 395/425, 467, 395/471, 464, 872, 445, 450, 452, 383, 414, 421.03, 584; 365/189.05; 711/137, 213, 123, 122

[56] References Cited

U.S. PATENT DOCUMENTS

| | | | |
|---|---|---|---|
| 5,113,515 | 5/1992 | Fite et al. ............................... | 711/125 |
| 5,170,476 | 12/1992 | Laakso et al. ......................... | 711/140 |
| 5,261,066 | 11/1993 | Jouppi et al. ......................... | 711/122 |
| 5,317,701 | 5/1994 | Reininger et al. ..................... | 395/383 |
| 5,317,718 | 5/1994 | Jouppi ................................... | 711/137 |
| 5,371,870 | 12/1994 | Goodwin et al. ..................... | 395/872 |
| 5,388,247 | 2/1995 | Goodwin et al. ..................... | 711/143 |
| 5,490,113 | 2/1996 | Tatosian et al. .................. | 365/189.05 |
| 5,640,526 | 6/1997 | Mahin et al. .......................... | 395/383 |

OTHER PUBLICATIONS

Palacharla, et al. in "Evaluating Stram Buffers as a Secondary Cache Replacement", IEEE 1063–6879 (1994).

*Primary Examiner*—Eddie P. Chan
*Assistant Examiner*—Hong C. Kim
*Attorney, Agent, or Firm*—Kelly K. Kordzik; Winstead Sechrest & Minick P.C.; Anthony V. S. England

[57] ABSTRACT

A method for selectively prefetching a cache line into a primary instruction cache within a processor from main memory allows for cold cache instruction prefetching of additional cache lines when the requested cache line does not reside within either the primary or secondary cache associated with the processor and there are not unresolved branches associated with the requested instruction in the cache line.

24 Claims, 5 Drawing Sheets

5,809,529

PREFETCHING OF COMMITTED INSTRUCTIONS FROM A MEMORY TO AN INSTRUCTION CACHE

CROSS-REFERENCE TO RELATED APPLICATIONS

This application is a continuation-in-part application of U.S. patent application, Ser. No. 08/518,348, entitled MODIFIED L1/L2 CACHE FOR AGGRESSIVE PREFETCH, filed Aug. 23, 1995, which is hereby incorporated by reference herein.

This application is also a continuation in-part application of U.S. patent application, Ser. No. 08/531,948, entitled CACHE CONTROLLED INSTRUCTION PREFETCHING, filed Sep. 18, 1995, which is hereby incorporated by reference herein.

This application for patent is related to the following applications for patent assigned to a common assignee:

INSTRUCTION PRE-FETCHING OF A CACHE LINE WITHIN A PROCESSOR, U.S. patent application, Ser. No. 08/540,374;

PRE-FETCHING DATA FROM MEMORY ACROSS PAGE BOUNDARIES, U.S. patent application, Ser. No. 08/529,470;

PROGRESSIVE DATA CACHE, U.S. patent application, Ser. No. 08/519,031;

A SYSTEM AND METHOD FOR DE-ALLOCATING STREAMS FROM A STREAM BUFFER, U.S. patent application, Ser. No. 08/519,032;

A SYSTEM AND METHOD FOR INDICATING THAT A PROCESSOR HAS PREFETCHED DATA INTO A PRIMARY CACHE AND NOT INTO A SECONDARY CACHE, U.S. patent application, Ser. No. 08/518,347; and SYSTEM FOR PREFETCHING DATA, U.S. patent application, Ser. No. 08/554,180.

These applications for patent are hereby incorporated by reference in the present disclosure as if fully set forth herein.

TECHNICAL FIELD

The present invention relates in general to data processing systems and, in particular, to a system and method for prefetching instructions into an instruction cache.

BACKGROUND INFORMATION

In modern microprocessor systems, processor cycle time continues to decrease as technology continues to improve. Also, design techniques of speculative execution, deeper pipelines, more execution elements and the like, continue to improve the performance of processing systems. The improved performance puts a heavier burden on the memory interface since the processor demands data and instructions more rapidly from memory. To increase the performance of processing systems, cache memory systems are often implemented.

Processing systems employing cache memories are well known in the art. Cache memories are very high-speed memory devices that increase the speed of a data processing system by making current programs and data available to a processor ("CPU") with a minimal amount of latency. Large on-chip caches (L1 caches) are implemented to help reduce the memory latency, and they are often augmented by larger off-chip caches (L2 caches).

The primary advantage behind cache memory systems is that by keeping the most frequently accessed instructions and data in the fast cache memory, the average memory access time of the overall processing system will approach the access time of the cache. Although cache memory is only a small fraction of the size of main memory, a large fraction of memory requests are successfully found in the fast cache memory because of the "locality of reference" property of programs. This property holds that memory references during any given time interval tend to be confined to a few localized areas of memory. For example, consecutive program instructions are typically stored in consecutive memory locations.

The basic operation of cache memories is well-known. When the CPU needs to access memory, the cache is examined. If the word addressed by the CPU is found in the cache, it is read from the fast memory. If the word addressed by the CPU is not found in the cache, the main memory is accessed to read the word. A block of words containing the one just accessed is then transferred from main memory to cache memory. In this manner, some data is transferred to cache so that future references to memory find the required words in the fast cache memory.

The average memory access time of the computer system can be improved considerably by use of a cache. The performance of cache memory is frequently measured in terms of a quantity called "hit ratio." When the CPU accesses memory and finds the word in cache, a cache "hit" results. If the word is found not in cache memory but in main memory, a cache "miss" results. If the CPU finds the word in cache most of the time, instead of main memory, a high hit ratio results and the average access time is close to the access time of the fast cache memory.

Prefetching techniques are often implemented to try to supply memory data to the on-chip L1 cache ahead of time to reduce latency. Ideally, data and instructions are prefetched far enough in advance so that copies of the instructions and data are always in the L1 (primary) cache when the processor needs it.

Existing prefetching techniques often prefetch instructions and/or data prematurely. Prefetching and then not using the prefetched instructions and/or data expands the time for a memory access but produces no benefit, thereby lowering the efficiency of the CPU.

A common example of this occurs whenever a processing system speculatively prefetches instructions when there remain unresolved branch instructions in the cache. The system may then prefetch instructions belonging in a branch that the program execution will not follow. The time spent fetching these instructions from memory is then wasted and causes unnecessary memory bus traffic.

When new programs or tasks are dispatched or invoked, their instructions are generally not located in the processor caches, since the caches only hold recently executed instructions (a situation where large segments of programs are invoked into the cache system is called a "cold cache"). Thus, a system and method is needed for reducing the penalty for initializing a "cold cache" to improve performance, when a "cold cache" is initiated, taking into account the criteria discussed above with respect to the prefetching of instructions.

SUMMARY OF THE INVENTION

The foregoing need is satisfied by the present invention which provides an apparatus for detecting the existence of program instructions that are to be executed and are not resident in the cache system in order to reduce the latency of a cold instruction cache. This is accomplished by detecting successive misses to both primary and secondary cache entries to initiate instruction prefetching to memory. In an embodiment of the invention, such prefetching is performed on "committed" instructions and not on instructions that are being executed due to a "speculative" branch guess.

Streaming of instructions is initiated if there is a miss with regard to the requested cache line on the primary cache and the secondary cache, and the instruction causing the cache miss is non-speculative (committed). Upon passing these requirements, a stream filter is checked to see if the address of the missed cache line was predicted in a filter entry (by a previous miss to the primary cache by a previous cache line). If there is a match with a stream filter entry, a stream is allocated and the address of the present line incremented by one and the present line incremented by two are saved in prefetch address registers. Then the lines for these two addresses are fetched from system memory to prefetch line buffers. If a line to be prefetched is in the secondary cache of the processor, the stream is deallocated.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWING

For a more complete understanding of the present invention, and the advantages thereof, reference is now made to the following descriptions taken in conjunction with the accompanying drawings, in which.

DETAILED DESCRIPTION

Figure 1:
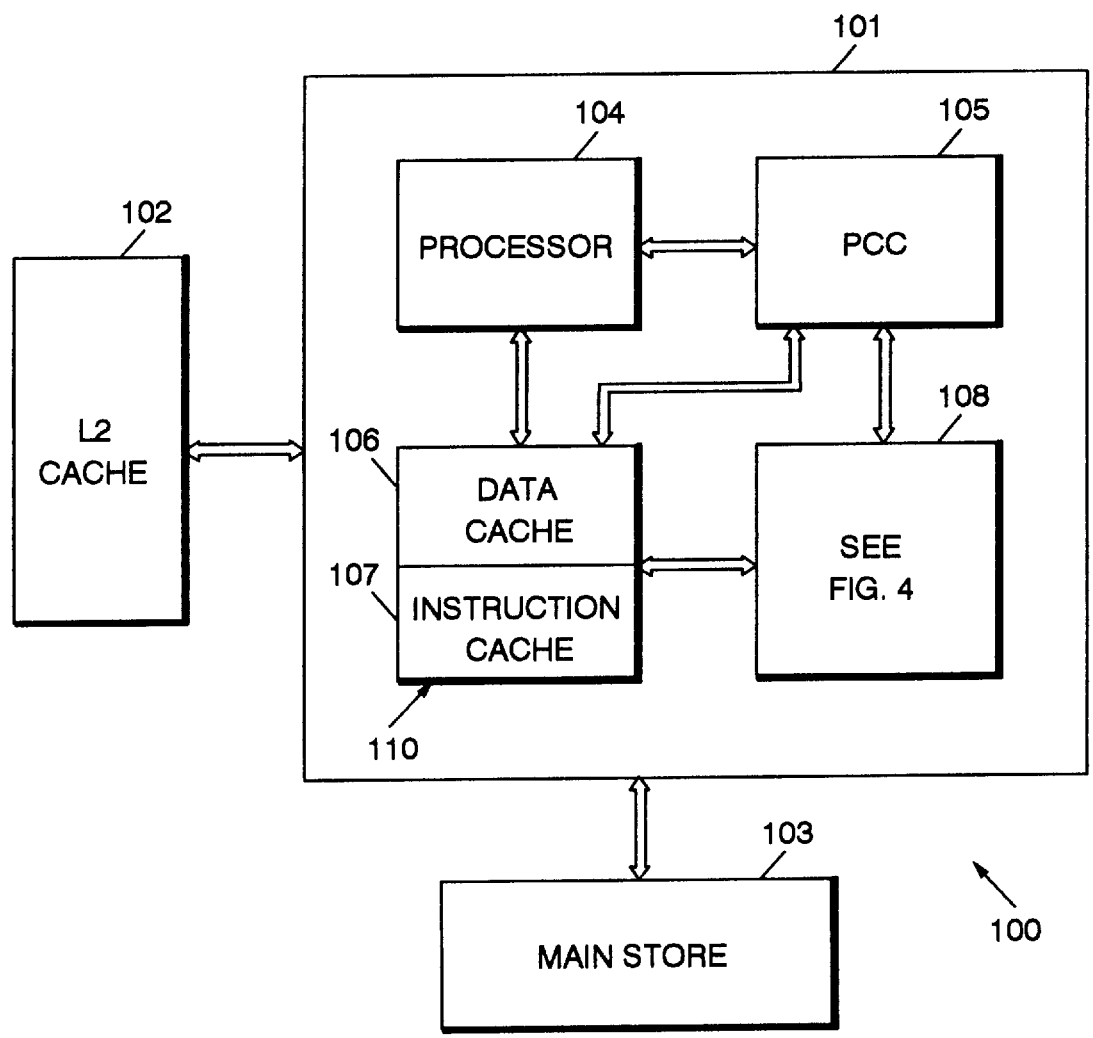
FIG. 1 illustrates a data processing system configured in accordance with the present invention.

In the following description, numerous specific details are set forth such as specific word or byte lengths, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Referring to FIG. 1, there is illustrated data processing system 100, which includes processor chip 101 coupled to system memory, or main store, 103, and having a secondary (L2) cache 102 coupled thereto. Processor chip 101 includes data processor 104, processor cache controller (PCC) 105, circuitry 108 further described with respect to FIG. 4, and primary (L1) cache 110, which may include data cache 106 and instruction cache 107. Separate data and instruction caches are well-known in the art. Processor 104 is able to cache instructions and data received from main store memory 103 into both data cache 106 and instruction cache 107. Hereinafter, instruction cache 107 may also be referred to as I-cache 107.

L1 I-cache 107 holds frequently used copies of program instructions from main store 103 using any replacement policy known in the art, such as that disclosed in U.S. patent application Ser. No. 08/519,031, which is hereby incorporated by reference in the present disclosure. L2 cache 102 is larger and holds more data than L1 I-cache 107 and ordinarily controls the memory coherence protocol for system 100. In an embodiment of the present invention, instructions in L1 I-cache 107 are not required to be contained in L2 cache 102.

The line drawn around chip 101 represents a chip boundary and a functional boundary, but is not meant as a restriction on the scope of the invention. PCC 105 controls fetching and storing to the memory subsystem (L1 cache 110, L2 cache 102). PCC 105 may also perform other functions in addition to controlling fetching and storing.

Figure 3:
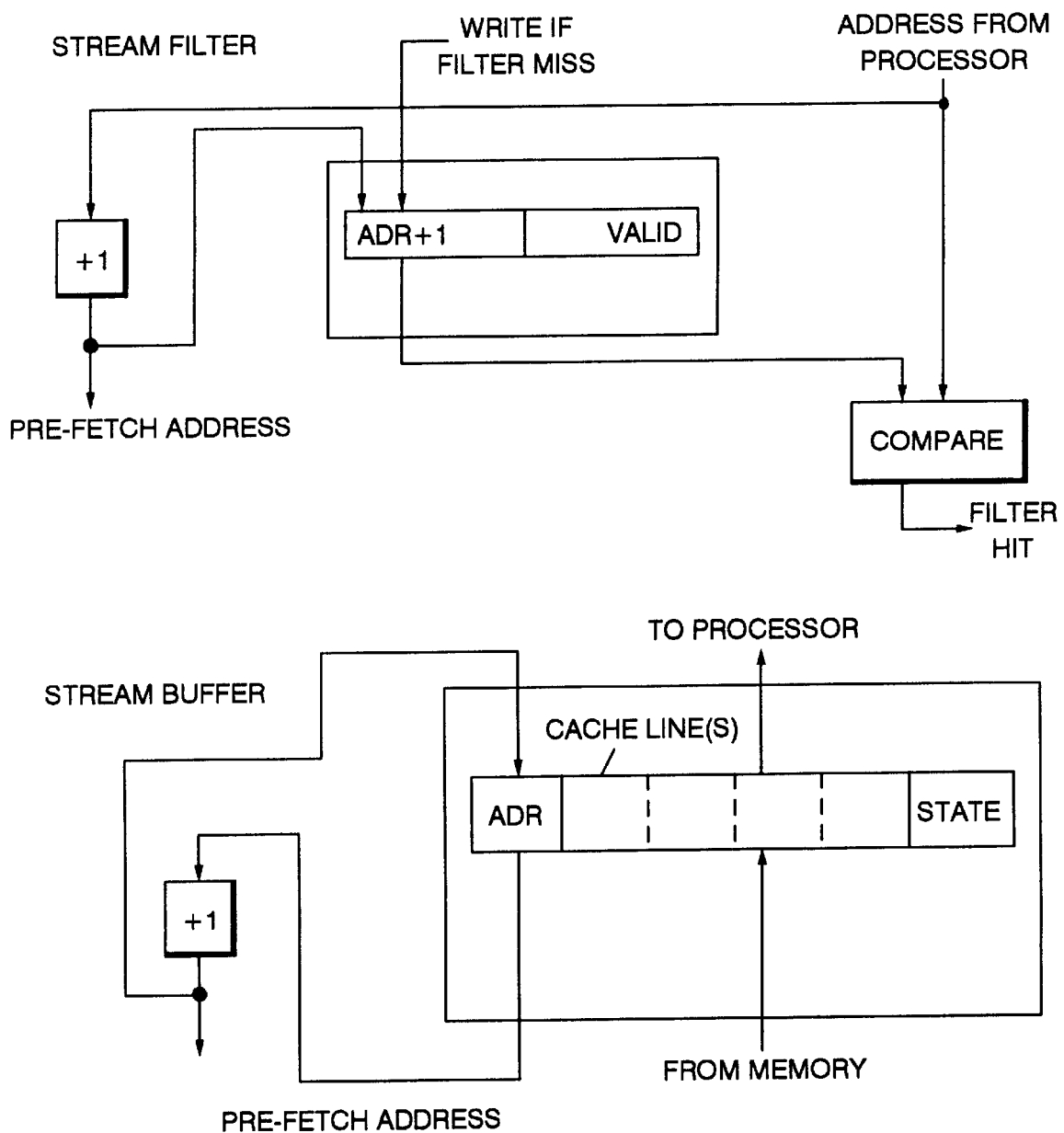
FIG. 3 illustrates a stream filter and a stream buffer utilized within the data processing system illustrated in FIG. 1.
Figure 4:
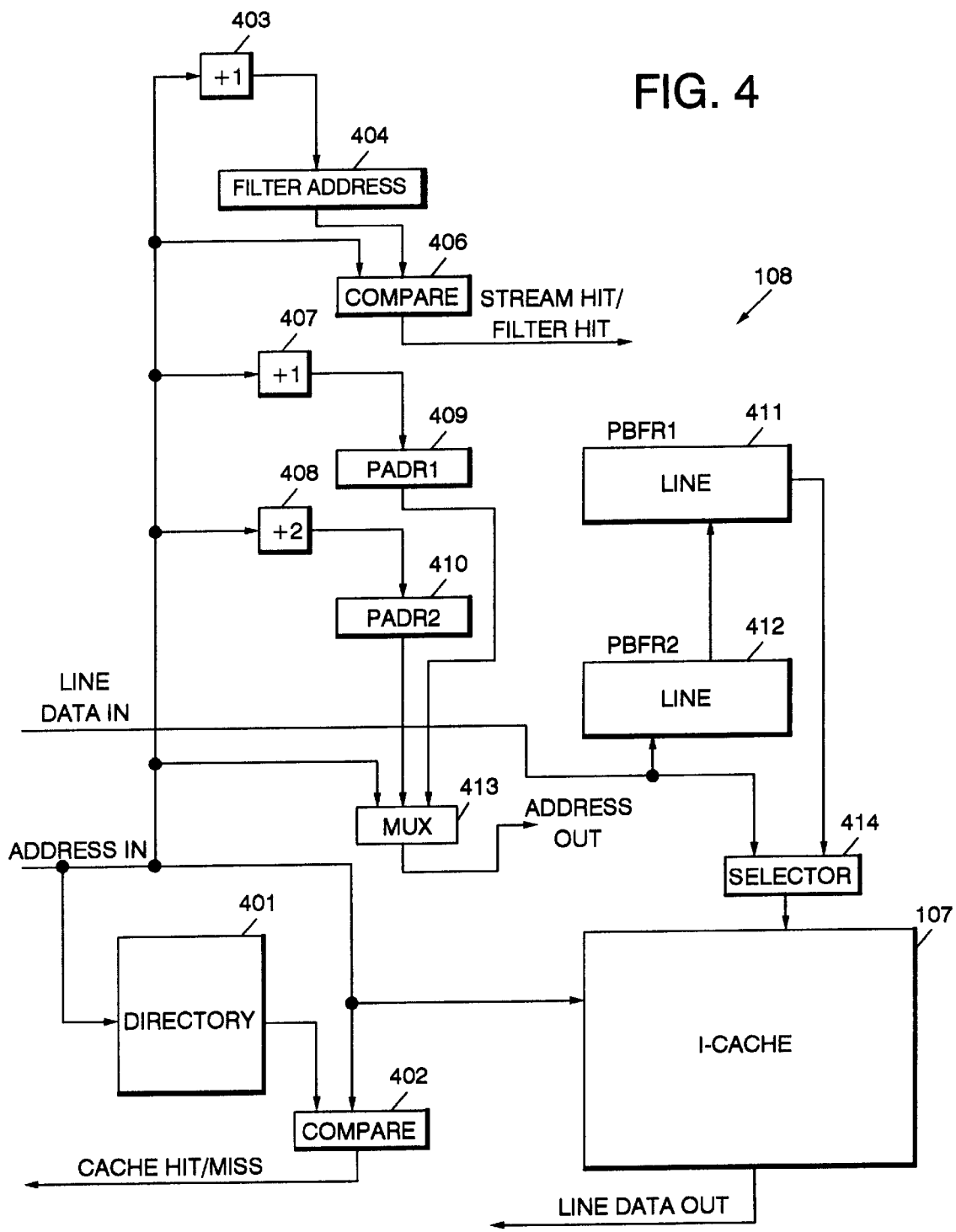
FIG. 4 illustrates internal logic within the processor chip illustrated in FIG. 1.

Referring next to FIG. 3, there is illustrated a stream filter and a stream buffer as utilized within the present invention (see FIG. 4). Stream filters are meant to reduce the occurrence of prefetching data that is not used. These filters are history buffers that contain address and direction information. The filter contains the address of a cache line that is the next sequentially higher line from one that missed in the L1 cache. If an access is made to the next higher cache line, a stream condition is detected and a stream buffer is allocated. The filter would be written with line address "X+1" if there was an access to "X." If there is a subsequent access to address "X+1" while "X+1" is still resident in the stream filter, "X+1" is then allocated as a stream.

Stream buffers are prefetch buffers that hold potential cache data. The idea is that if the program executing within processor 104 is executing a sequential stream of data/instructions, prefetching additional lines into a stream buffer could be useful. Thus, a subsequent cache miss could find the data in the stream buffer. The stream filter and stream filters cooperate such that if there is an L1 cache miss that also misses the stream buffers, the miss address is compared against the addresses stored in the stream filter. If there is a hit in the stream filter (meaning that there was a sequential access to sequential lines of data) then there is a good possibility that the next line will also be needed in the future.

Figure 5:
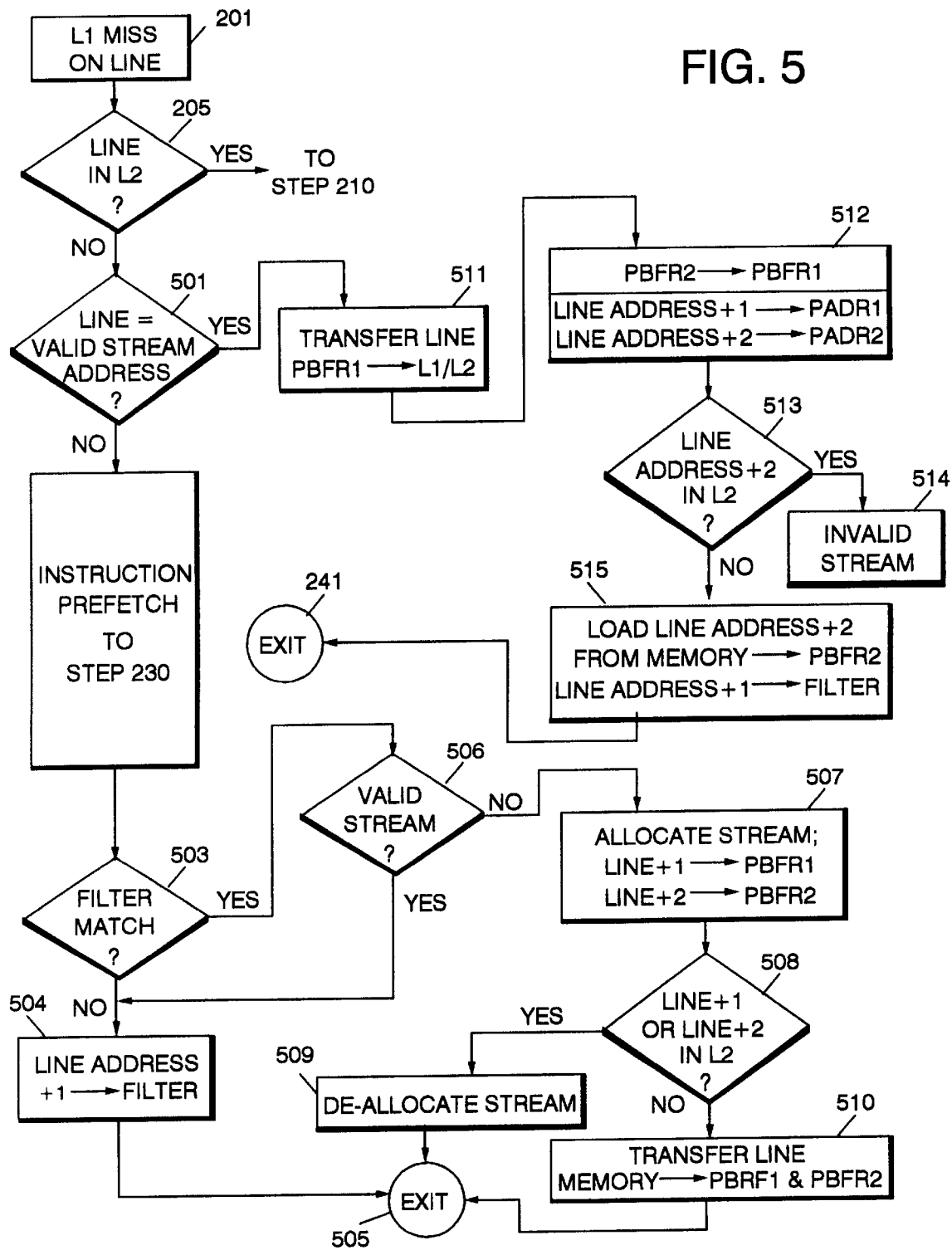
FIG. 5 illustrates a flow diagram illustrating an instruction prefetching scheme in accordance with the present invention.

Referring next to FIGS. 4 and 5, there is illustrated an embodiment of the present invention. FIG. 4 further illustrates circuitry 108 and I-cache 107 as illustrated in FIG. 1. The flow diagrams illustrated in FIGS. 2 and 5 may be implemented as a state machine residing in PCC 105 or elsewhere within chip 101.

The process begins with an address for a requested instruction arriving from processor 104 and being compared by comparator 402 to cache entries in cache directory 401. If there is a cache hit, meaning that the requested instruction resides within I-cache 107, a cache hit signal will be transmitted from comparator 402 back to PCC 105, and the requested cache line of instructions will be sent from I-cache 107 to processor 104.

However, if the requested cache line associated with the requested instruction does not reside within I-cache 107, a cache miss signal (step 201) will be sent from comparator 402 to PCC 105. When processor 104 requests the cache line from I-cache 107 and the cache line is not in I-cache 107 (i.e., an L1 Miss occurs), the state machine searches for the missed cache line in L2 cache 102 (step 205). If the cache line is resident in L2 cache 102, the state machine fetches the cache line from L2 cache 102 into L1 I-cache 107 (step 210). If the cache line is not in L2 cache 102, the process moves to step 501 wherein a determination is made whether or not the requested cache line is associated with a valid stream address. A valid stream address indicates that a stream has already been allocated for this cache line. This comparison is done between the address received into comparator 406 and the cache line address stored in filter address buffer 404. When these addresses match and the stream is valid, the result is a stream hit signal to PCC 105.

If the cache line is not associated with a valid stream address, the present invention waits for the resolution of all branches affecting the fetch of the cache line, before fetching the cache line from main memory 103 (steps 230 and 235). This prevents the unnecessary prefetching of instructions from main memory that may have been cancelled without ever being used. As used herein, "cancelled" means that processor 104 requests some other line, for example Line X, rather than the expected Line M. If the cache line is determined to be in the correct branch path, the cache line is fetched from main memory 103 into L1 I-cache 107 and/or L2 cache 102 (step 240).

Regardless of whether the cache line is in L2 cache 102 or not, the state machine tests L1 I-cache 107 for the presence of the next higher line (e.g., Line M+1, if the cache line is Line M) (step 215). If Line M+1 is in L1 I-cache 107, no further action is needed (step 241). If Line M+1 is not in L1 I-cache 107, the state machine then tests L2 cache 102 for Line M+1 and, if found, speculatively prefetches Line M+1 from L2 cache 102 into L1 I-cache 107 (steps 220 and 225).

The state machine also verifies whether Line M+1 crosses a logical boundary (page or block) in memory 103 (step 222). Line M is normally translated into a real physical address, but Line M+1 is not. Therefore, Line M+1's location in physical memory is indeterminate. If Line M+1 is in a separate logical boundary, the state machine will not prefetch Line M+1 from L2 cache 102, thereby preserving bandwidth between L1 and L2 (step 241). Instead, when processor 104 requests Line M+1, the process will be re-entered at step 205.

If the Line M+1 is not in L2 cache 102, the present invention will not prefetch Line M+1 from main memory 103 into L1 I-cache 107 or L2 cache 102 until all branches in Line M have been resolved and Line M+1 becomes committed (step 241).

It will be evident to one skilled in the art that the present invention may be used to speculatively prefetch from L2 cache 102 on L1 I-cache 107 hits, as well as L1 I-cache 107 misses.

Figure 2:
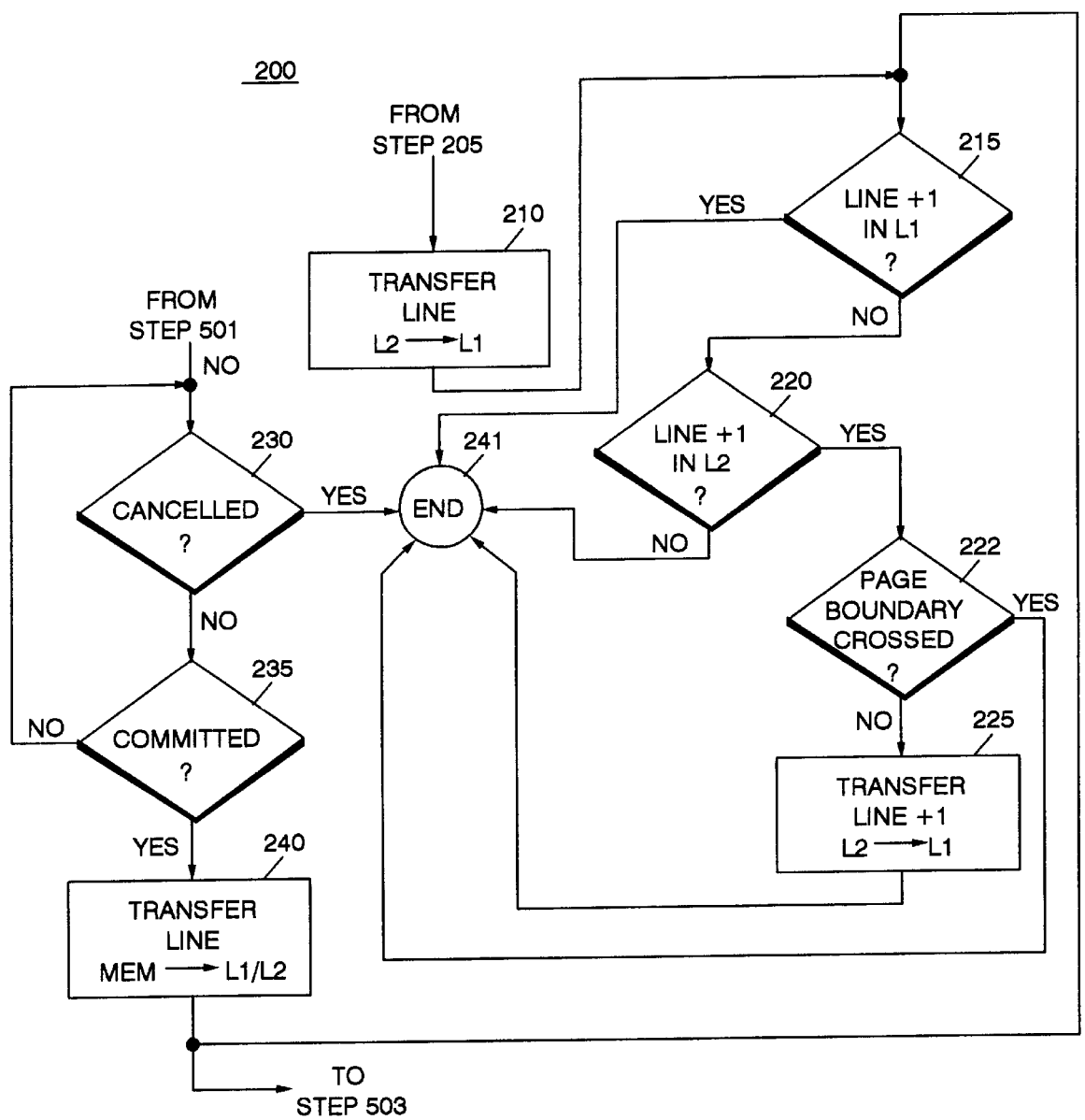
FIG. 2 illustrates a flow diagram of a prefetching operation in accordance with the present invention.

For a further discussion of the process illustrated in FIG. 2, please refer to U.S. patent application, Ser. No. 08/531, 948 cross-referenced above.

In step 240, the requested cache line is transferred from main memory 103 into I-cache 107 and/or L2 cache 102. This is indicated in FIG. 4 by the Line Data input into selector circuit 414, which selects this cache line to be stored into I-cache 107. Furthermore, a corresponding Address for this cache line is input into directory 401. In step 503, a determination is made whether or not there is a match with this cache line and an address within stream filter address buffer 404. If yes, step 506 determines whether or not the matched filter address indicates a valid stream has been allocated with respect to this address. If so, the process returns to step 504.

In step 504, the cache line address is incremented by one and stored within filter address buffer 404 using the incrementing circuit 403. The process will then end at step 505 and wait for the next request from processor 104.

If in step 506, the match with filter address buffer 404 indicates that it is not a valid stream, the process proceeds to step 507 to allocate a stream. This is accomplished by incrementing by one by circuit 407 the cache line address and entering this address into prefetch address buffer one (PADR1) 409, and incrementing the cache line address by two with circuit 408 and entering this incremented address into prefetch address buffer two (PADR2) 410.

Thereafter, in step 508, a determination is made whether or not the cache line incremented by 1 and the cache line incremented by 2 are located within L2 cache 102. If yes, the stream is deallocated in step 509 and the process ends with step 505. However, if these two cache lines are not located within L2 cache line 102, in step 510, these lines will be transferred from main store 103 into prefetch buffer 1 (PBFR1) 411 and prefetch buffer 2 (PBFR2) 412, respectfully. PBFR1 411 and PBFR2 412 may be located anywhere within system 100 and still be utilized as stream buffers. Essentially, These two addresses are then multiplexed along with the address of the requested cache line by multiplexor 413 and sent out to main store 103. Main store 103 will return the requested cache line as indicated in step 502 and will also return the cache line incremented by one and store it into prefetch buffer 1 (PBFR1) 411 and store the cache line incremented by 2 into prefetch buffer 2 (PBFR2) 412.

If in step 501, the cache line is represented within a valid stream, the process will proceed to step 511, wherein this cache line is transferred from PBFR1 411 into I-cache 107 and/or L2 cache 102. Next, in step 512, the entry in PBFR2 412 would be transferred to PBFR1 411. Correspondingly, the address retained within PADR1 409 will be incremented by 1 and the address within PADR2 410 will be incremented by 1 also.

Next, in step 513, a determination is made whether or not the cache line incremented by 2 resides within L2 cache 102. If yes, in step 514, a determination is made to invalidate the allocated stream. However, if this cache line is not located within L2 cache 102, the process will proceed to step 515 to load the cache line incremented by 2 from main store 103 into PBFR2 412. Also, the cache line address within filter address buffer 404 will be incremented by 1. The process then will exit at step 241. Hereinafter, the discussion provides an example of the operation of the process described above with respect to FIGS. 1–5.

Processor 104 begins execution of a new code sequence, starting with an instruction residing within cache line α. For this example, none of the lines of code comprising this new code sequence exist in either L1 I-cache 107 or L2 cache 102. When processor 104 requests line α, the present invention would detect no filter hit, and therefore load α+1 into stream filter address buffer 404. Cache line α will be retrieved from memory 103 to I-cache 107 as this line does not reside within I-cache 107 or L2 cache 102, and the instruction is committed.

When processor 104 then requests α+1, another miss results as this line is also not in I-cache 107 or L2 cache 102. Consequently, α+2 will be placed into stream filter address buffer 404. And, cache line α+2 will be retrieved into PBFR1 411, and α+3 will be retrieved into PBFR2 412.

Thereafter, when there is a miss on I-cache 107 and L2 cache 102 for requested cache line α+2, α+2 will be retrieved from PBFR1 411 into I-cache 107, α+3 will be moved from PBFR2 412 into PBFR1 411, and α+4 will be retrieved from main store 103 into PBFR2 412. Also, α+3 will be entered into filter address buffer 404.

If subsequently, cache line β is then requested by processor 104, and cache line β refers to a new set of instructions not related to those previously prefetched, the process then begins over with step 501.

The present invention provides a unique technique for prefetching instructions for new code sequences (a cold cache prefetch). Note that prefetching of only the incremented address incremented by 1 to single line buffer PBFR1 411 may be implemented. Additionally, an alternative embodiment may implement more than one instruction stream at a time. Alternatively, prefetching instruction stream data may be done to L2 cache 102 in addition to instruction cache 107. Or, prefetching of instruction stream data may be made only to L2 cache 102.

Additionally, an alternative embodiment may speculatively load prefetched instruction stream data into I-cache 107. Furthermore, an alternative embodiment may share instruction stream logic with data stream logic.

Although the present invention and its advantages have been described in detail, it should be understood that various changes, substitutions and alterations can be made herein without departing from the spirit and scope of the invention as defined by the appended claims.

What is claimed is:

1. A method for prefetching instructions from a memory to an instruction cache coupled to a processor in a data processing system, said method comprising the steps of:
   receiving a request for an instruction from said processor to said instruction cache;
   if said instruction is not in said instruction cache, retrieving a data portion associated with said instruction from said memory to said instruction cache if said instruction has been committed;
   incrementing an address of said data portion to refer to an incremented data portion;
   determining if said incremented data portion is in said instruction cache;
   if said incremented data portion is not in said instruction cache, determining if an address of said incremented data portion is in a stream filter coupled to said processor; and
   if said address of said incremented data portion is in said stream filter, allocating a stream of data portions to be prefetched from said memory.

2. The method as recited in claim 1, wherein said allocating step further comprises the step of:
   retrieving said incremented data portion from said memory into a first buffer coupled to said instruction cache.

3. The method as recited in claim 2, wherein said data portion and said incremented data portion are cache lines, and wherein said address of said incremented data portion is incremented by one cache line from said address of said data portion, and wherein said allocating step further comprises the steps of:
   incrementing by two cache lines said address of said data portion; and
   retrieving a data portion having said address incremented by two cache lines from said memory into a second buffer coupled to said instruction cache.

4. The method as recited in claim 1, wherein said step of determining if said incremented data portion is in said instruction cache further comprises the step of determining if said incremented data portion is in a secondary cache coupled to said processor.

5. The method as recited in claim 4, further comprising the step of:
   de-allocating said stream if said incremented data portion is in said secondary cache coupled to said processor.

6. The method as recited in claim 3, further comprising the steps of:
   incrementing said address in said stream filter;
   receiving a second request from said processor for a second instruction having an address corresponding to said address incremented in said stream filter;
   retrieving said incremented data portion from said first buffer to said instruction cache; and
   retrieving said data portion having said address incremented by two cache lines from said second buffer to said first buffer.

7. The method as recited in claim 1, wherein said instruction cache includes a primary cache coupled to said processor.

8. The method as recited in claim 1, wherein the retrieving, incrementing, allocating, and determining steps are only performed if said instruction has been committed.

9. The method as recited in claim 1, wherein said step of retrieving said data portion further comprises the step of determining if said instruction has been committed.

10. The method as recited in claim 1, wherein said retrieving step is only performed if said instruction has been committed.

11. A data processing system comprising:
    a processor;
    an instruction cache coupled to said processor;
    a prefetch buffer coupled to said instruction cache, wherein said data processing system is adaptable for coupling to a memory device; and
    control logic operable for prefetching instructions from said memory device to said instruction cache, said control logic further comprising:
      circuitry operable for receiving a request for a cache line from said processor to said instruction cache;
      compare circuitry operable for determining if said cache line is in said instruction cache;
      circuitry operable for retrieving said cache line from said memory to said instruction cache if an instruction associated with said cache line has been committed;
      circuitry operable for incrementing by one an address of said cache line to refer to an incremented cache line;
      compare circuitry operable for determining if said incremented cache line is in said instruction cache;
      compare circuitry operable for determining if an address of said incremented cache line is indicated in a stream filter coupled to said processor if said incremented cache line is not in said instruction cache; and
      circuitry operable for allocating a stream of cache lines to be prefetched from said memory if said address of said incremented cache line is in said stream filter.

12. The system as recited in claim 11, wherein said allocating circuitry further comprises circuitry operable for retrieving said incremented cache line from said memory into a first buffer coupled to said instruction cache.

13. The system as recited in claim 12, wherein said allocating circuitry further comprises:

circuitry operable for incrementing by two said address of said cache line; and circuitry operable for retrieving a cache line having said address incremented by two from said memory into a second buffer coupled to said instruction cache.

14. The system as recited in claim 11, wherein said compare circuitry operable for determining if said incremented cache line is in said instruction cache further comprises circuitry operable for determining if said incremented cache line is in a secondary cache coupled to said processor.

15. The system as recited in claim 14, further comprising:

circuitry operable for de-allocating said stream if said incremented cache line is in said secondary cache coupled to said processor.

16. The system as recited in claim 11, further comprising:

circuitry operable for invalidating said stream when said processor requests an instruction unrelated to said instruction associated with said cache line.

17. The data processing system as recited in claim 11, wherein said processor, instruction cache, prefetch buffer, and control logic reside on a single chip.

18. The data processing system as recited in claim 11, further including said memory device and a bus, wherein said processor is coupled to said memory device via said bus.

19. The method as recited in claim 11, wherein said instruction cache includes a primary cache coupled to said processor.

20. The system as recited in claim 11, wherein said retrieving circuitry, said incrementing circuitry, said allocating circuitry, said compare circuitry operable for determining if said incremented cache line is in said instruction cache, and said compare circuitry operable for determining if said address of said incremented cache line is indicated in said stream filter are only enabled to perform their functions if said instruction associated with said cache line has been committed.

21. The system as recited in claim 11, wherein said retrieving circuitry further comprises:

circuitry operable for determining if said instruction associated with said cache line has been committed.

22. In a data processing system comprising a processor, an instruction cache coupled to said processor, a prefetch buffer coupled to said instruction cache, a memory device coupled to said processor, and a stream filter coupled to said processor, a method for prefetching instructions from said memory device to said instruction cache, said method further comprising the steps of:

receiving a request for a cache line from said processor to said instruction cache;

determining if said cache line is in said instruction cache;

retrieving said cache line from said memory to said instruction cache if an instruction associated with said cache line has been committed;

incrementing by one an address of said cache line to refer to an incremented cache line;

determining if said incremented cache line is in said instruction cache;

determining if said incremented cache line is in a secondary cache coupled to said processor;

determining if an address of said incremented cache line is indicated in said stream filter coupled to said processor if said incremented cache line is not in said instruction cache and not in said secondary cache;

retrieving said incremented cache line from said memory into a first buffer coupled to said instruction cache;

incrementing by two said address of said cache line; and retrieving a cache line having said address incremented by two from said memory into a second buffer coupled to said instruction cache.

23. The method as recited in claim 22, wherein said step of retrieving said cache line from said memory to said instruction cache further includes the step of retrieving said cache line from said memory to said secondary cache.

24. The method as recited in claim 22, wherein said instruction cache includes a primary cache coupled to said processor.

* * * * *